(12) United States Patent
Warn et al.

(10) Patent No.: US 8,873,200 B2
(45) Date of Patent: Oct. 28, 2014

(54) SPINSTANDS FOR TESTING A HEAD GIMBAL ASSEMBLY

(75) Inventors: Ian Stanley Warn, Southampton (GB); Andrew William Atkins, Southampton (GB)

(73) Assignee: Xyratex Technology Limited, Havant (GB)

( * ) Notice: Subject to any disclaimer, the term of this patent is extended or adjusted under 35 U.S.C. 154(b) by 246 days.

(21) Appl. No.: 13/499,582

(22) PCT Filed: Oct. 19, 2010

(86) PCT No.: PCT/EP2010/065686
§ 371 (c)(1),
(2), (4) Date: Mar. 30, 2012

(87) PCT Pub. No.: WO2011/048075
PCT Pub. Date: Apr. 28, 2011

(65) Prior Publication Data
US 2012/0200287 A1    Aug. 9, 2012

Related U.S. Application Data

(60) Provisional application No. 61/253,998, filed on Oct. 22, 2009.

(51) Int. Cl.
*G11B 17/022* (2006.01)
*G01R 33/00* (2006.01)
*G11B 5/48* (2006.01)

(52) U.S. Cl.
CPC .................................. *G11B 5/4826* (2013.01)
USPC ........................................ 360/137; 324/262

(58) Field of Classification Search
CPC .. G11B 5/455; G11B 5/59633; G11B 5/4555; G11B 5/5552; G11B 33/10
USPC ........................................... 360/137; 324/262
See application file for complete search history.

(56) References Cited

U.S. PATENT DOCUMENTS 6,229,664 B1 *  5/2001  Albrecht et al. ................. 360/75
6,510,752 B1 *  1/2003  Sacks et al. ................... 73/865.9
6,531,867 B1 *  3/2003  Greene et al. ................. 324/262
7,131,346 B1 * 11/2006  Buttar et al. ................. 73/865.9

(Continued)

FOREIGN PATENT DOCUMENTS

GB          2 441 645         3/2008

OTHER PUBLICATIONS

International Search Report and Written Opinion dated Apr. 27, 2011 in corresponding International Patent Application No. PCT/EP2010/065686.

*Primary Examiner* — Brian Miller
(74) *Attorney, Agent, or Firm* — Pillsbury Winthrop Shaw Pittman LLP

(57) ABSTRACT

There is disclosed a spinstand for testing a head gimbal assembly. The spinstand includes a gripper operable to grip the head gimbal assembly and a load pick device operable to hold a head gimbal assembly and to move the head gimbal assembly into an exchange position where it can be gripped by the gripper. In the exchange position part of the load pick device registers with the gripper and another part of the load pick device is spaced from the gripper so as to form a space between, in which space at least part of the head gimbal assembly is located in use.

13 Claims, 12 Drawing Sheets

(56) References Cited

U.S. PATENT DOCUMENTS

| | | | |
|---|---|---|---|
| 7,520,047 B2 * | 4/2009 | Collins et al. | 29/603.04 |
| 7,768,740 B2 * | 8/2010 | Pettman et al. | 360/99.08 |
| 7,911,740 B2 * | 3/2011 | Warn | 360/137 |
| 7,954,119 B2 * | 5/2011 | Warn et al. | 720/703 |
| 8,169,750 B1 * | 5/2012 | Guzik et al. | 360/294.4 |
| 8,611,048 B2 * | 12/2013 | Brady et al. | 360/137 |
| 2005/0056337 A1 | 3/2005 | Magee et al. | |
| 2005/0209797 A1 * | 9/2005 | Anderson et al. | 702/57 |
| 2006/0103382 A1 * | 5/2006 | Mihara et al. | 324/262 |
| 2007/0136022 A1 | 6/2007 | Anderson et al. | |
| 2007/0143056 A1 | 6/2007 | Anderson et al. | |
| 2008/0061776 A1 | 3/2008 | Collins et al. | |
| 2012/0038999 A1 | 2/2012 | Brady et al. | |

* cited by examiner

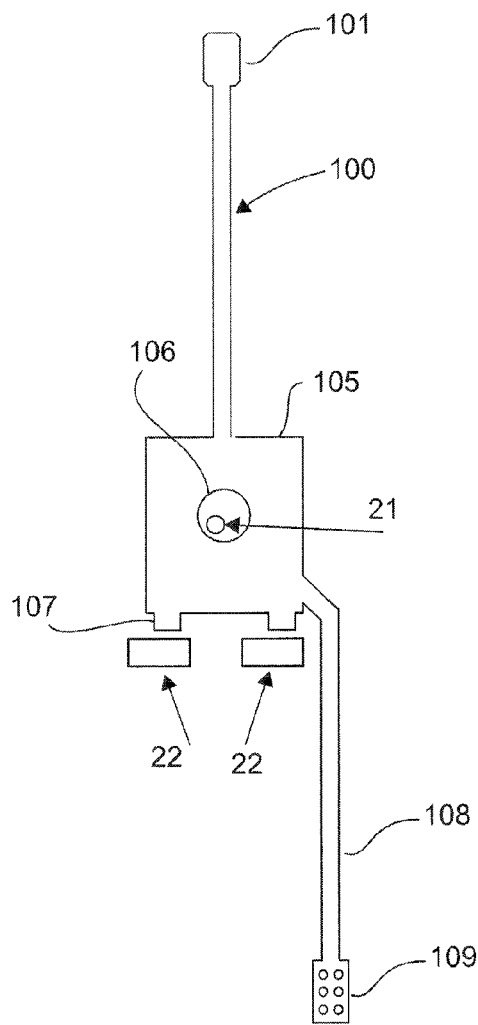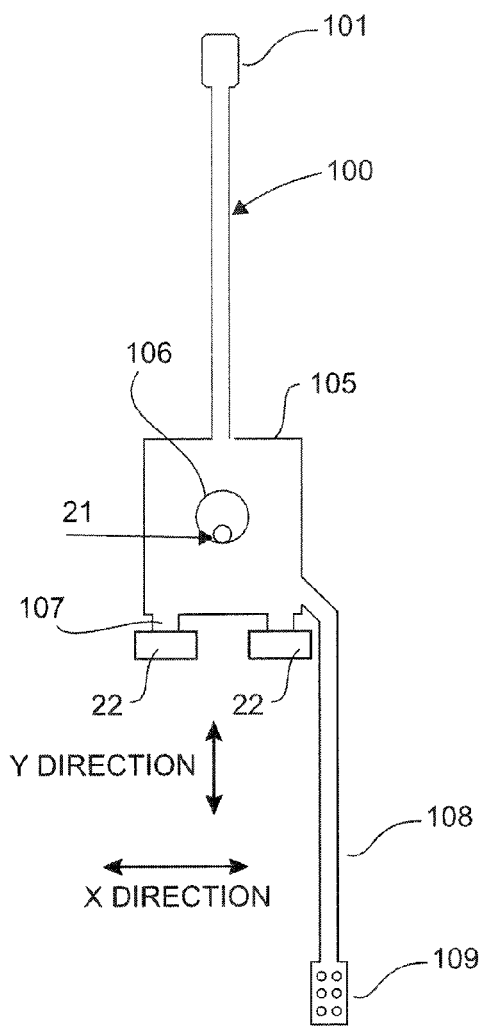
Fig. 8A  Fig. 8B
Fig. 8

SPINSTANDS FOR TESTING A HEAD GIMBAL ASSEMBLY

CROSS REFERENCE TO RELATED APPLICATIONS

This application is the National Phase entry of PCT/EP2010/065686, filed Oct. 19, 2010, which claims the benefit of priority to U.S. application Ser. No. 61/235,998, filed Oct. 22, 2009, the content of these applications is incorporated herein by reference in their entirety.

BACKGROUND

The present invention relates to spinstands for testing a head gimbal assembly.

A so-called spinstand (also known as a head/media test apparatus or head tester) is a mechanical platform that can simulate the environment of a disk drive so that tests can be performed on the various components of a disk drive, such as the read/write head or the disk. Typically a spinstand comprises a high-mass deck on which is mounted a spindle for clamping and rotating a magnetic disk. Also provided on the deck is a mechanism commonly known as a test nest for holding and loading the head to the disk. Test data is then written to or read from the disk with the head.

Testing with a spinstand can be performed in a research and development setting or in a manufacturing setting. For instance, as part of the process of manufacturing most modern disk drive assemblies, the read/write head is subjected to a dynamic electrical test on a spinstand before being incorporated into the disk drive assembly to ensure that the performance of the head is acceptable. Usually the head is tested after having been incorporated into a head gimbal assembly (HGA), such as shown by FIG. 1 and described in more detail below.

In order to test a HGA with a spinstand, the HGA to be tested must be received by the spinstand by attaching the HGA to the test nest. As part of the process of receiving the HGA in a spinstand, electrical connection must be made to the HGA. The head must also be aligned with high accuracy relative to the spinstand, a process commonly known as "precising" the HGA. After testing, the tested HGA is removed from the test nest. These steps can be performed by a human operator. Alternatively, some or all of these steps can be automated.

In handling the HGA during the process of attaching the HGA to the test nest, it is important to do so without causing damage, deformation or marking to the HGA. It is desirable that the attachment process is fast so as to optimise test process speeds. The attachment process must of course grip the HGA firmly during testing. The attachment process should be precise, reliably and repeatable. It is also desirable to keep the apparatus involved in attaching the HGA to the test nest as simple as possible, both to improve reliability and to reduce cost. During test, the HGA must be moved with great precision and preferably with great speed. It is therefore desirable that the attachment parts of the spinstand that hold the HGA during testing allow for precise and fast movement profiles for the HGA. The attachment process should preferably also lend itself to being automated.

Various schemes are known in the prior art for attaching a HGA to a test nest in a spinstand. For example, US2007/0143056 ("Head Gimbal Assembly Loader"), US2005/0056337 ("Method And Apparatus For Head Gimbal Assembly Testing") and US2007/0136022 ("Alignment Of Unmounted Head Gimbal Assemblies For Testing") teach a test nest having a collet mechanism for centering and clamping the HGA to the test nest. A separate mechanism called a precising nest is provided away from the test nest for precising the HGA. The precising nest comprises two tapered pins which engage respectively with the boss hole and the tooling hole of the HGA when the HGA is positioned on the precising nest to precise the HGA. A linear motion positioning stage is provided to move the HGAs from the precising nest to the test nest.

US-A-2008/0061776 ("Method And Apparatus For Loading A Read/Write Head To A Spinstand") discloses a spinstand having separate precising stations that precise a HGA away from the test nest before the HGA is transferred to the test nest by a linear actuator.

SUMMARY

These prior art schemes each provide a separate precising assembly for precising the HGA away from the test nest and then transfer the HGA to the test nest with a precise linear actuator so that the precise orientation of the HGA achieved by the precising operation is kept when the HGA is transferred to the test nest. These schemes tend to be complicated and expensive to implement.

According to a first aspect of the present invention, there is provided a spinstand for testing a head gimbal assembly, the spinstand comprising: a gripper operable to grip a said head gimbal assembly; and, a load pick device operable to hold a head gimbal assembly and to move the head gimbal assembly into an exchange position where it can be gripped by the gripper, wherein in said exchange position part of the load pick device registers with the gripper and another part of the load pick device is spaced from the gripper so as to form a space between, in which space at least part of a said head gimbal assembly is located in use.

This arrangement in effect provides a space or cavity between the load pick device and the gripper. The registration of part of the load pick device and the gripper means that the size of the cavity can be accurately controlled. Preferably, the cavity is arranged to receive the base plate of the head gimbal assembly. The preferred cavity is arranged so that the head gimbal assembly is generally constrained in its position to avoid misalignment, but so that it allows small amounts of movement to allow the HGA to be precised and clamped in the correct position.

For example in preferred embodiments, the cavity means that the HGA is positioned with enough accuracy that the engagement member may locate the boss hole and so that the head gimbal assembly does not miss the stops when it is urged by the engagement member. However, the cavity is preferably arranged so that when small amounts of movement are possible for the head gimbal assembly, i.e. enough movement is possible to allow the head gimbal assembly to be urged against the stops of the gripper so that it may be precised. Without the cavity, if the pick was not disengaged with the head gimbal assembly, it would be too constrained in its movement to be accurately precised by the engagement member, and if the pick was disengaged with the head gimbal assembly and moved away, there would be a risk that the unconstrained head gimbal assembly shift in position enough that the engagement member could not engage with the boss hole, or that the head gimbal assembly could miss the stops.

In a preferred embodiment, the load pick device has a surface against which the head gimbal assembly is held when the head gimbal assembly is held by the load pick device and at least one protrusion, which extends from said surface for registering with the gripper. This in effect provides a recessed portion in the load pick device for containing the head gimbal assembly. As well as registering with the gripper so as to define the depth of the cavity, the protrusions can be arranged to limit possibly lateral movement of the head gimbal assembly when the pick device has registered with the gripper and released the HGA. This can help prevent possible misalignment of the head gimbal assembly when precising and clamping the HGA.

By urging the HGA against the stop of the gripper, the HGA is given a precise positioning in the x-y-plane. Then by clamping the HGA against the base portion of the gripper, the HGA is given a precise positioning in the z-direction as well as being securely gripped by the gripper, i.e. the test nest. This arrangement provides a simple and convenient way of precising and attaching a HGA to a spinstand. In contrast, prior art spinstands such as the spinstand disclosed by US2007/0143056 ("Head Gimbal Assembly Loader") and US2007/0136022 ("Alignment Of Unmounted Head Gimbal Assemblies For Testing") teach test nests incorporating relatively complex collet mechanisms for gripping the HGA and separate mechanisms for precising the HGA. These add complexity and cost.

Preferably said surface against which the head gimbal assembly is held is in communication with at least one fluid port via which low fluid pressure, i.e. a vacuum or near vacuum, can be applied to hold said head gimbal assembly. This provides a convenient way of holding the HGA with the pick device.

The spinstand may comprise an unload pick device for picking up a said head gimbal assembly from the gripper, wherein the unload pick is arranged not to register with the gripper when picking up a said head gimbal assembly. The unload pick device does not need to register against the gripper. The unload pick device preferably has a generally flat surface for contacting or coming into close proximity with the HGA when picking up the HGA. Again, fluid ports may be provided on the surface via which a vacuum may be applied to pick up and hold the HGA.

Preferably, a first end of one or both pick devices is compliantly attached to the second end of that pick device and, and wherein at least one guide member is attached between the first and second ends of that pick device so that relative movement between the first and second ends of that pick device is substantially limited to only one direction. For example, a compliant layer of material, such as an elastomer, can be sandwiched between the two ends of either or both pick devices. The compliant means helps reduce shock and vibration when the pick device engages with the test nest or another nest. A pin or other member or members can be disposed between the ends so that the ends are constrained to move in the direction of the pin, i.e. the direction in which the pick moves, which is the z-direction in the examples described herein. This allows the compliant means to reduce shock and vibration due to the movement of the pick when contacting the nest, whilst reducing movement in other directions so as to maintain precision in the positioning of the HGA in the x-y plane.

In a preferred embodiment, the gripper comprises an engagement member which is movable to fix in place the head gimbal assembly. The preferred engagement member can provide a simple mechanism that can be implemented by relatively low mass components which allow the HGA to be moved with fast and precise movement profiles during testing. In contrast, prior art mechanisms tend to have a relatively high mass due to their complex natures which leads to reduced acceleration and longer settling times when moving the HGA. This means that the present invention allows faster and more precise testing of heads, which is highly desirable in a manufacturing setting.

Preferably the spinstand comprises a positioning device having a base portion and a movable portion which is movable relative to the base portion, the gripper being supported by the movable portion so that the gripper is positionable by the positioning device; and, an actuator operable to engage with and move the engagement member, the actuator being supported by the base portion of the positioning device and not by the movable portion of the positioning device.

According to a second aspect of the present invention, there is provided a spinstand for testing a head gimbal assembly, the spinstand comprising: a gripper operable to grip a said head gimbal assembly, wherein the gripper comprises a movable engagement member which, when a head gimbal assembly is offered up to the gripper, is movable to fix in place the head gimbal assembly; a positioning device having a base portion and a movable portion that is movable relative to the base portion, the gripper being supported by the movable portion so that the gripper is positionable by the positioning device; an actuator operable to engage with and move the engagement member, the actuator being supported by the base portion of the positioning device and not by the movable portion of the positioning device.

The actuator can be for example a pneumatic actuator or a solenoid or other suitable device or devices. By this arrangement, the typically relatively high mass of the actuator does not have to be moved by the positioning device that moves the gripper and thus the HGA during operation of the spinstand. This means that the movable portion of the positioning device has less mass to move. This allows increased accelerations and shorter settling times to be used and therefore improves the performance of the spinstand in making fine adjustments to the position of the head during testing.

Preferably the actuator is disengageable from the engagement member. This means that the actuator can be moved away from the test nest and moving part of the positioning device during testing so that it has no influence on the movement of the HGA moved by the positioning device.

Preferably, the engagement member is biased to be in a position where it fixes in place the head gimbal assembly, wherein the actuator is operable to move the engagement member against the bias. The biasing can be accomplished by any suitable member, such as a spring. Importantly, the member used for biasing can easily be implemented by a member having a low mass compared with the actuator, which are typically more bulky and have a higher mass. Thus, the spring rather than the actuator is used for clamping the HGA during testing.

Preferably, the gripper comprises a base portion to which the engagement member is movably attached, at least one stop extending from the base portion; wherein the engagement member is arranged and configured to move such that the engagement member urges the head gimbal assembly against the stop and clamps the head gimbal to the base portion of the gripper.

Preferably, the or each stop presents a planar surface against which the head gimbal assembly is urged.

Preferably, the engagement member is arranged and configured to move in a direction generally perpendicularly towards said planar surface to urge the head gimbal assembly against the at least one stops.

Preferably, the engagement member comprises a stem portion and a head portion, the head portion having a greater diameter than the stem portion so as to provide a shoulder therebetween, wherein the engagement member is arranged and configured to move such the stem portion acts against the side of the boss hole of the head gimbal assembly to urge the head gimbal assembly against the stop and the shoulder clamps the head gimbal assembly against the base portion of the gripper.

Preferably, the engagement member stem contacts the side of the boss hole closest to the planar surface when urging the head gimbal assembly against the at least one stop.

These arrangements for urging the head gimbal assembly against the stops allow the head gimbal assembly to be precised in the x-, y- and theta directions before being clamped against the base of the gripper.

Preferably, the engagement member is pivotably mounted, for example to the gripper. This provides a simple convenient mechanism for the engagement member.

Preferably, the engagement member has a mushroom shape. Other shapes for the engagement member are possible. For example, the engagement member may have a hooked shape or a pawl shape. In any case, it is preferred that the stem of the engagement member is circular which helps in aligning the head gimbal assembly on account of the circular boss hole with which it engages when aligning the head gimbal assembly.

According to a third aspect of the present invention there is provided a spinstand for testing a head gimbal assembly, the spinstand comprising: a gripper operable to grip a said head gimbal assembly; and, a movable clamp that can be actuated to clamp a said head gimbal assembly when gripped by the gripper, wherein the movable clamp has a first portion for clamping the electrical contacts of the head gimbal assembly against electrical contacts of the spinstand to make electrical connection between the spinstand and the head gimbal assembly, and a second portion for clamping the flex circuit of the head gimbal assembly against a surface of the spinstand.

This provides a simple mechanism to make secure electrical contact from the head gimbal assembly to the spinstand and also securely clamping and thus flatten the flex circuit of the head gimbal assembly to prevent possible fluttering of the flex circuit due to the effects of "windage" when the disk of the spinstand is spinning. Windage is the name given to air fluctuations caused by the spinning disk. In prior art schemes, it is known to vacuum the flex circuit to the test nest. However, it is difficult to get the flex circuit completely flat with this arrangement, meaning that the air movement caused by windage can get under the flex circuit and lift up the flex circuit causing fluttering of the flex circuit, which can adversely affect the accuracy of the precision testing carried out by the spinstand. The mechanism of the present invention avoids or reduces these problems.

The first and second portions may be provided by different parts of the same member. In a preferred embodiment, the clamp member comprises a triangular plate part of which clamps the flex circuit and part of which clamps the electrical contacts.

Preferably, the spinstand has a grooved member and the clamp has a cam disposed in the groove of the grooved member in which it can move so as to guide the movement of the clamp in clamping the head gimbal assembly. Because the HGA is preferably delivered to the gripper from above, it is preferable to be able to move the clamp down to clamp the HGA from the side. The cam provides a simple and convenient way of controlling the motion of the clamp.

In an embodiment, the movable clamp is arranged to clamp both a head gimbal assembly having an up head configuration and a head gimbal assembly having a down head configuration. Preferably, the clamping portions extend both sides of the test nest so as to be able to clamp the flex circuit and electrical contacts whichever side of the test nest the flex circuit is located according to whether the HGA has an up head or down head. In reconfiguring the spinstand to test an HGA of a different type (i.e. up or down head), the cam may be swapped to provide suitable clamping functionality.

Generally, the preferred embodiments of the present invention provide an advantageously fast, precise and repeatable way of precising and gripping a HGA with a gripper, e.g. a test nest, without causing damage, deformation or marking to the HGA.

It should be noted that references in this document to the x-y plane and to the x- and y-direction (or axes) relate to directions parallel to the deck of the spinstand, and references to the z-direction or "raising" or "lowering" a part relate to directions perpendicular to the deck.

DESCRIPTION OF DRAWINGS

Embodiments of the present invention will now be described by way of example with reference to the accompanying drawings, in which:

FIGS. 8A and 8B show a HGA being received and precised by the test nest of FIG. 2;

DETAILED DESCRIPTION

Figure 1:
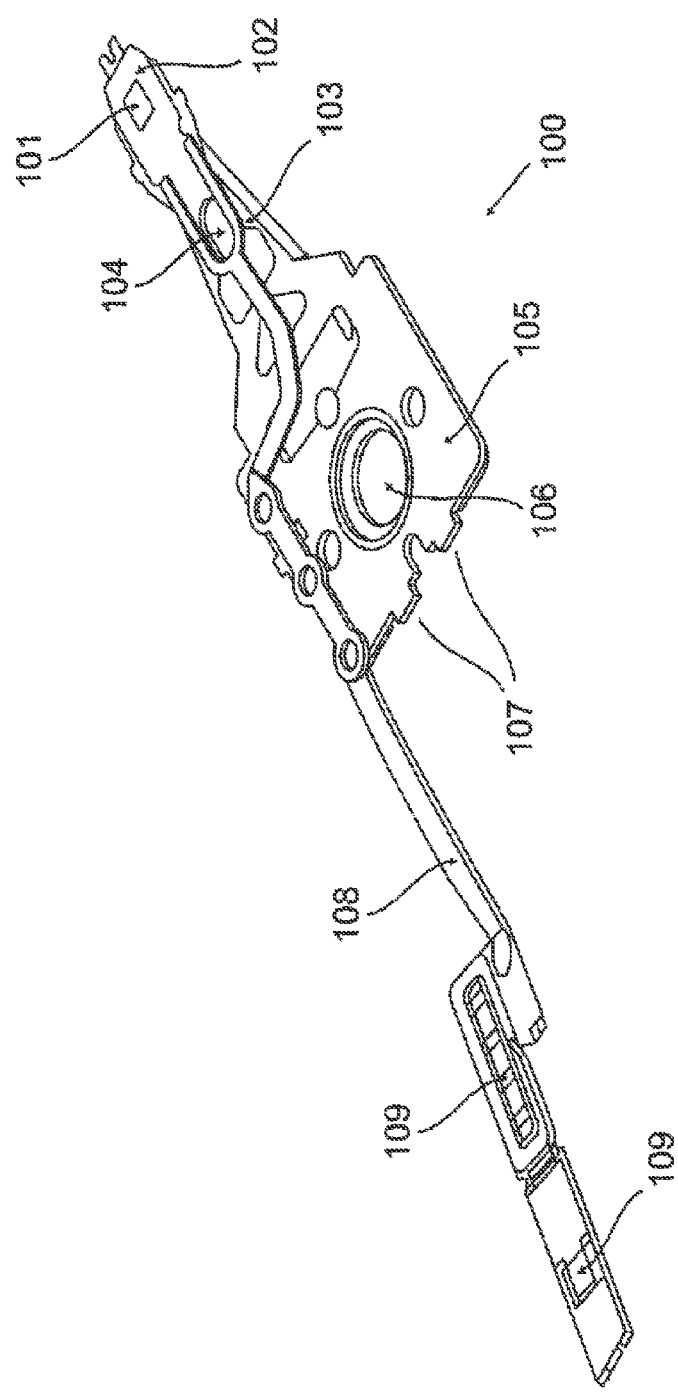
FIG. 1 shows a typical head gimbal assembly.

Read/write heads for use in a hard disk drive assembly are usually tested once the slider has been mounted on the suspension, i.e. once they have been incorporated into a head gimbal assembly (HGA). FIG. 1 shows a typical HGA 100 of the type testable by a spinstand. The HGA 100 has a magnetic read/write head 101 for reading from and writing to a disk. The head 101 is supported on a slider which in turn is mounted via a gimbal 102 to a suspension arm 103. These are arranged to "fly" the head 101 over the surface of the disk at an appropriate height for reading from and writing to the disk. The suspension arm 103 also has a tooling slot 104 formed in it. The suspension arm 103 is attached to a base plate 105. The base plate 105 has a boss hole 106 in its centre by which the HGA 100 can be held. Two locating tabs 107 extend from the edge of the base plate 105 furthest from the head 101. A flex circuit 108 (also known as a flex-on-suspension (FOS) or FOS tail), which is a flexible thin strip containing the connecting wires, connects to the head 101 at one end and terminates in an array of electrical contacts 109 (also known as a pogo pin block) at its other end allowing connections to be formed to the HGA 100 by the spinstand electronics.

Figure 2:
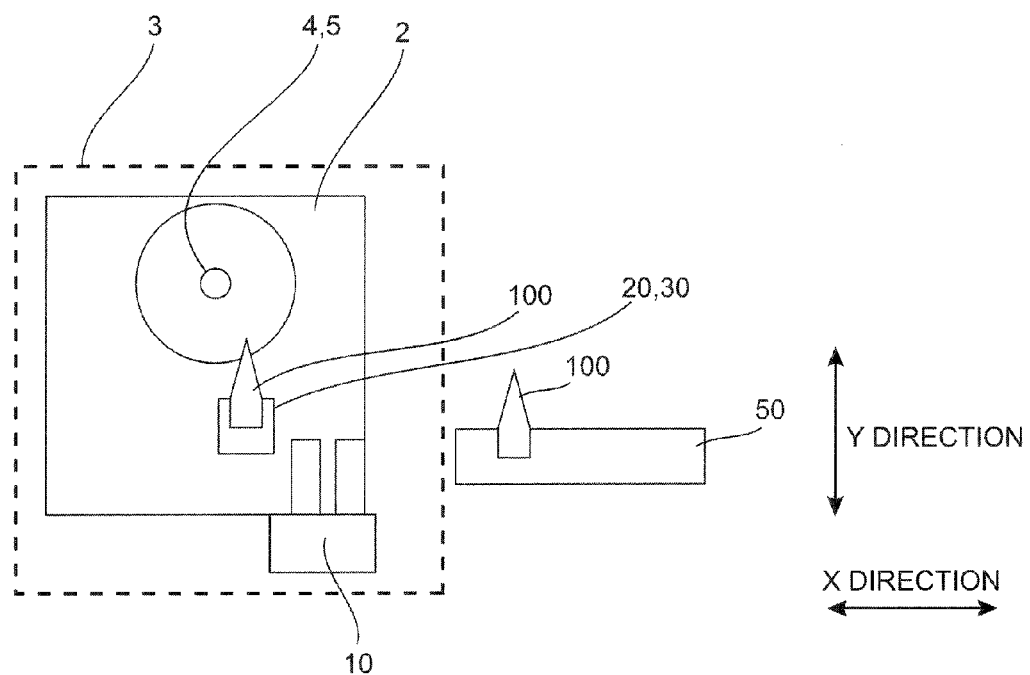
FIG. 2 shows schematically an example of a spinstand according to an embodiment of the present invention.

FIG. 2 shows schematically an apparatus for testing a read/write head (also known as spinstand) 1 in accordance with aspects of the present invention. The spinstand 1 comprises a deck 2 surrounded by a safety enclosure 3. The spinstand 1 has a spindle assembly 4 for holding and rotating a disk 5 to be tested. The spinstand 1 also has a test nest 20 or gripper for holding the HGA 100 during testing. The test nest 20 is supported by a puck 30 which is movable over the surface of the deck 2 and can make connection to the HGA 100 and load it to the disk 5. The spinstand 1 also comprises automation for loading and unloading a HGA 100 to and from the test nest 20. These features of the spinstand 1 as described so far are generally known per se in the prior art.

Various automation schemes are known in the art. In the present example, the automation comprises a carriage or shuttle 50 for transporting HGAs 100 into and out of the safety enclosure 3 and a pick 10 for exchanging HGAs between the carriage 50 and the test nest 20. A suitable form of automation for operation with the present invention is described in the commonly owned U.S. Ser. No. 61/176,335 filed 7th May, 2009 entitled "Apparatus And Method For Receiving And Positioning A Read/Write Head To A Disk For Testing And Method Of Removing A Tested Read/Write Head From A Test Apparatus", the entire contents of which are incorporated herein by reference. The operation of this spinstand of the present example is described in more detail below and is the same as U.S. Ser. No. 61/176,335 except where otherwise described in this description. It will be appreciated that the present invention is not limited to being used with this particular automation scheme however.

Figure 3:
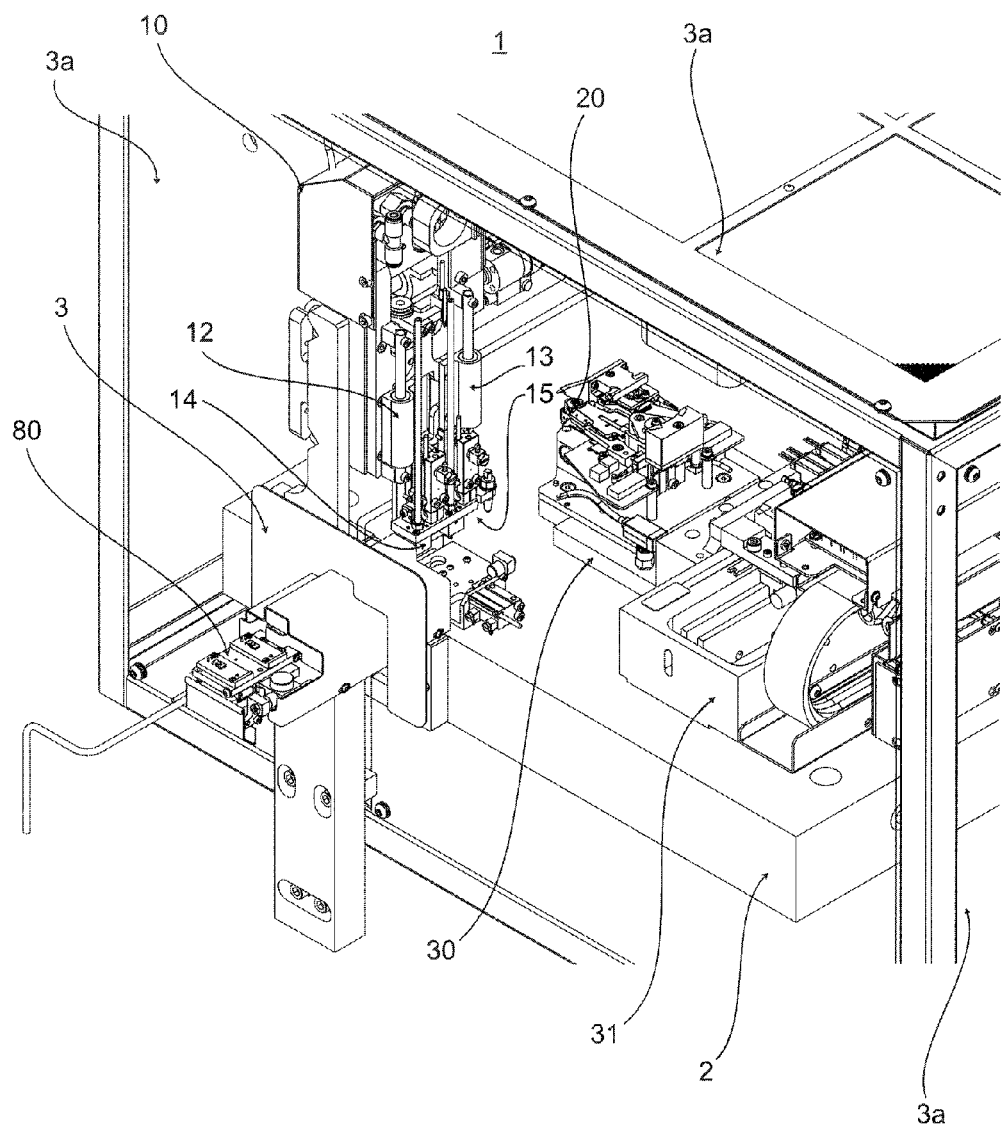
FIG. 3 shows a detail view of the spinstand of FIG. 2.

FIG. 3 shows an elevated view of the spinstand 1 (the spindle 4 and disk 5 not being shown for clarity). The deck 2 has a high mass, for example being made from a block of granite. The deck 2 is compliantly mounted to a frame (not shown) by pneumatic or other vibration damping mounts so as to "float". This isolates the spinstand 1 from external vibrations and provides a very stable mechanical platform on which testing may be performed. As will be appreciated, it is important to isolate the spinstand from external vibrations as much as possible, as these can adversely affect the delicate testing being performed by the spinstand.

The safety enclosure 3 comprises walls 3a made from plexi-glass or some other suitable material and is preferably mechanically isolated from the deck 2, for example being attached to the frame (not shown). The safety enclosure 3 is arranged to protect the operator of the spinstand 1 from injury when the spinstand is in use, such as might be caused for example by contact with the automation of the spinstand or from flying glass in the event that a disk 5 having a glass substrate shatters whilst being spun.

Figure 4:
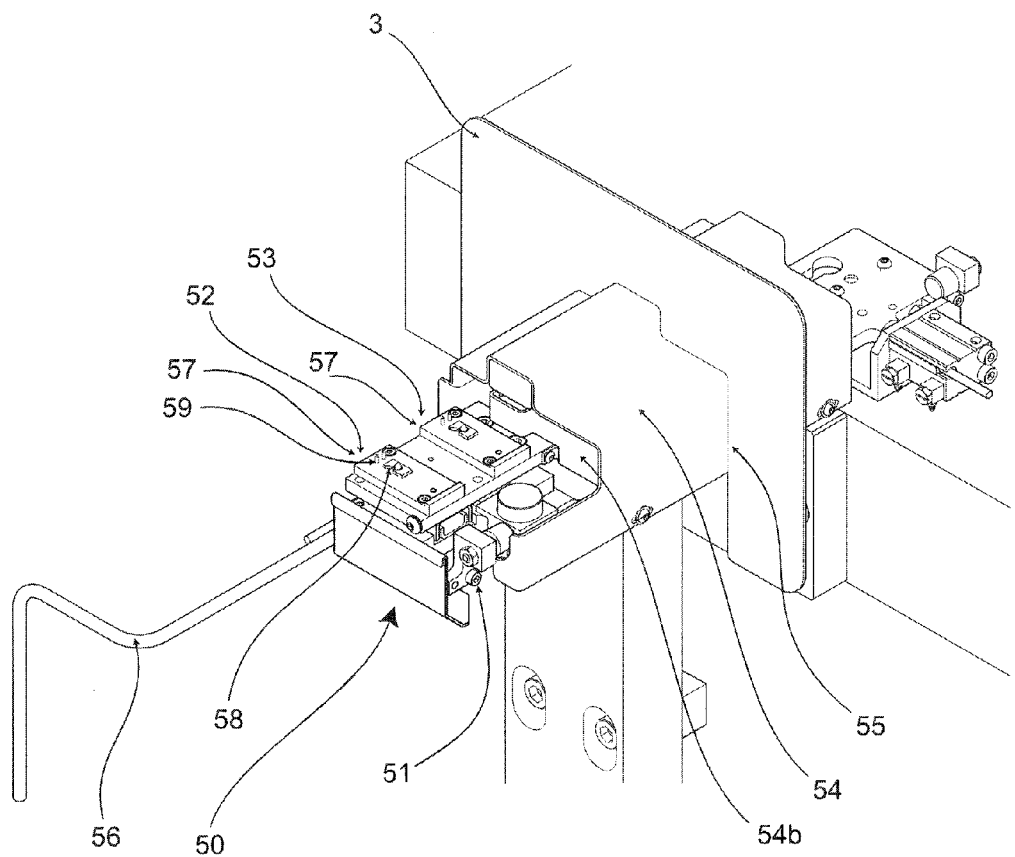
FIG. 4 shows a detail view of the carriage of FIG. 2.

As shown by FIG. 4, the carriage 50 has two HGA receiving portions 52, 53, or nests, thereon each for receiving and holding a HGA 100. The first HGA receiving portion is known as the load nest 52, in which the operator places HGAs 100 to be tested. The second HGA receiving portion is known as the unload nest 53, from which the operator removes HGAs 100 after they have been tested. A sleeve 54 extends through an aperture 55 in the safety enclosure 3, through which the carriage 50 moves in a manner similar to a matchbox. One or more baffles 54b are provided so that there is no line of sight through the sleeve 54 in any position of the carriage 50. The carriage 50 is mechanically isolated from the deck 2, for example being attached to the frame (not shown), to avoid introducing vibration to the spinstand 1 through movement of the carriage 50. This arrangement allows HGAs 100 to be changed without having to stop the media disk spinning, or without stopping testing due to shock and/or vibration.

The load nest 52, and optionally the unload nest 53, has a coarse precisor 57 arranged to receive a HGA 100 and give it a general positioning. The coarse precisor 57 includes a boss pin 58 and a pair of "goalposts" 59 in the form of a pair of pins projecting upwards from the uppermost surface of the carriage 50. When a HGA 100 is placed on the coarse precisor 57, the boss hole 106 in the base plate 105 of the HGA 100 engages with the boss pin 58, thereby coarsely positioning the HGA 100 in the x-y direction, and the suspension arm 103 is received between the goalposts 59, giving a rough theta positioning to the HGA 100.

During operation of the spinstand, the carriage 50 is moved between a first position, where it is positioned so that the load and unload nests 52, 53 are accessible to an operator outside the safety enclosure 3 and a second position, where it is positioned so that the load and unload nests 52, 53 lie underneath the pick 10 so that the pick 10 can transfer HGAs 100 to and/or from the carriage 50.

Figure 5:
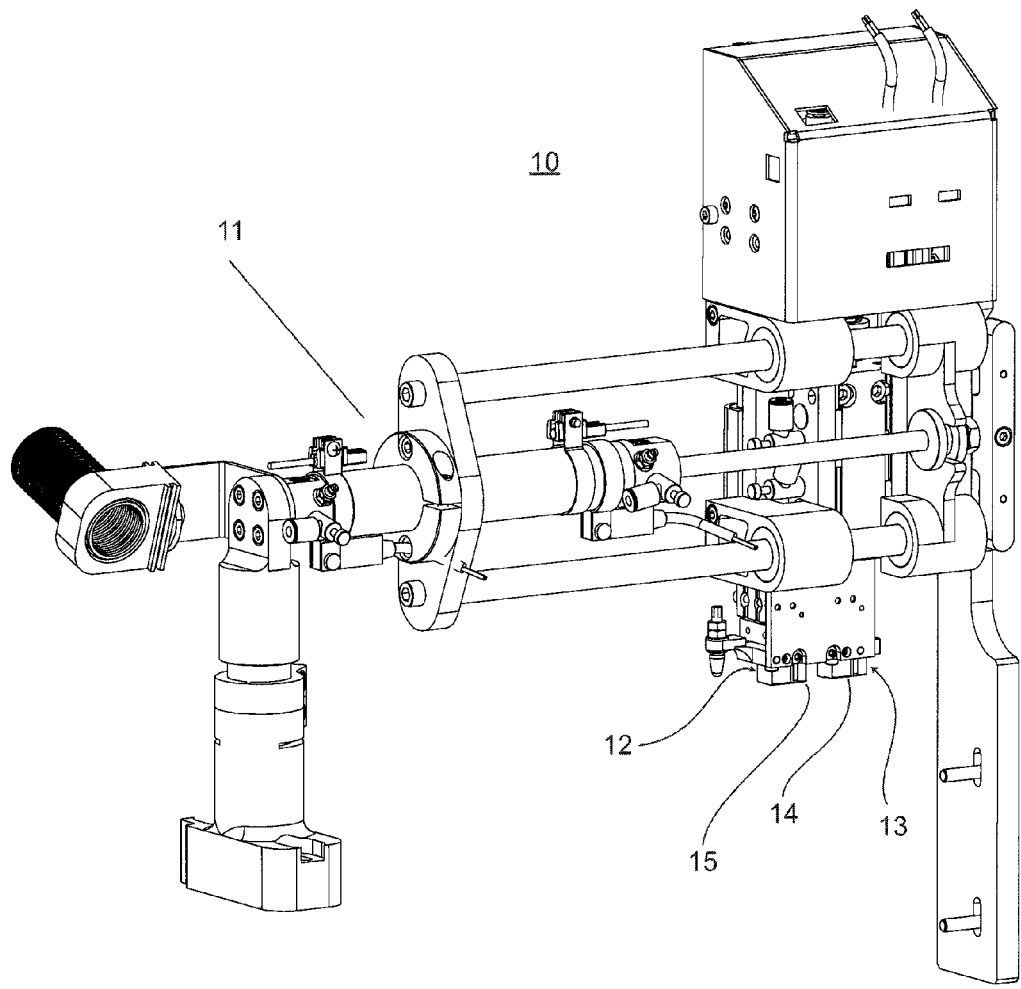
FIG. 5 shows a detail view of the linear actuator and pick of FIG. 2.

The pick 10 is shown in more detail by FIG. 5. The pick 10 is attached to a linear actuator 11 which is mounted to the deck 2. The linear actuator 11 is operable to move the pick 10 laterally relative to the surface of the deck 2 (i.e. in the x-y plane). The pick 10 comprises load and unload kickers 12, 13 (or pick devices), each having a vacuum end effector 14, 15 disposed at its lower end. The load kicker 12 is for transferring HGAs 100 to be tested from the load nest 52 of the carriage 50 to the test nest 20, and the unload kicker 13 is for transferring HGAs 100 once tested from the test nest 20 to the unload nest 53 of the carriage 50. The pick 10 is capable via air actuation or a servo controlled motor or other appropriate actuator of moving the kickers 12, 13 in the z-direction, i.e. to be vertically raised or lowered. In the present example, the kickers 12, 13 are joined so that they are moved in the z-direction together, though the kickers 12, 13 may be independently movable in other examples.

Thus, with a HGA 100 positioned beneath either or both end kickers 12, 13, the pick 10 can be actuated to lower the kickers 12, 13 so that the end effectors 14, 15 are in contact with or positioned closely above the base plate of the HGA 100 when held by any one of the test nest 20, the load nest 52 and the unload nest 53. The end effectors 14, 15 have vacuum ports 18 (shown in FIG. 6) in their lower surfaces 14b, 15b through which a vacuum can then be applied so that ambient air pressure causes the base plate 105 to be forced against said lower surfaces. In other words, the HGA 100 is "vacuumed" or "suctioned" onto the end effector 14, 15 to hold it in place. The pick 10 can then be actuated to raise the kickers 12, 13, thereby picking up the HGA 100. The HGA 100 can be put down by the kickers 12, 13 by a generally similar process in reverse. It should be noted however, that there are important differences between the load and unload end effectors 14, 15 which are described in more detail below.

As well as being movable to position the head 101 under the disk 5 as described above, the puck 30 can be moved such that the test nest 20 lies underneath either of the kickers 12, 13. Thus, by appropriate positioning of the carriage 50 and the puck 30 and by appropriate operation and positioning of the pick 10, HGAs 100 can be transferred between the carriage 50 and the test nest 20 via the pick 10. The pick 10 is positioned by the linear actuator 11 in different locations over the deck 2 for exchanging HGAs 100 with the carriage 50 and with the test nest 20. This is so that when transferring a HGA 100 from the carriage 50 to the test nest 20, it is not necessary to move the carriage 50 out of the way before the test nest 20 can be moved underneath the kickers 12, 13, and visa versa.

A potential complication arises from the fact that the deck 2 on which the puck 30 moves is compliantly mounted relative to the frame, in order to reduce the amount of vibration transmitted to the deck 2 and all the apparatus mounted on it, which includes the kicker and its transport. The carriage 50, however, is mounted on the frame, and therefore movement can occur between the carriage 50 and the kicker 12. This means that, without special arrangements, the load kicker 12 might not be positioned relative to the HGA 100 with enough precision to be able to pick up the HGA 100 from the load nest 52 or to pick up the HGA 100 with enough accuracy to allow the HGA 100 to be subsequently transferred to the test nest 20, as described later.

To overcome this problem the load and unload nests 52, 53 are mounted on the carriage 50 in such a way, for example via some intermediary layer of compliant material, as to allow a small amount of lateral movement, which is of the order of the amount that the deck 2 can move relative to the frame. Between the load kicker 12 and the load nest 52 is an alignment aid for aligning the load kicker 12 and load nest 52 when the load kicker 12 descends to pick up an HGA 100. A suitable method of alignment is a shaped pin on the carriage 50 entering a hole on the kicker 12. Other, more sophisticated means, for example using cams, can be used to ensure correct positioning between the nests 52, 53 and the kicker 12, as will be known to those skilled in the art. When this has happened the nests 52, 53 and the kicker 12 are sufficiently precisely aligned to allow the load kicker 12 to pick up an HGA 100 correctly.

Referring again to FIG. 3, the puck 30 is mounted on the deck 2 by an air bearing (not shown) and is movable in two orthogonal directions on the surface of the deck 2 by a highly accurate x-y positional stage 31. The puck 30 can be vacuumed down to the deck 2 in a desired position. Thus, as known in the art per se, the puck 30 is movable to position the head 101 to a test track on the disk 5 to test the HGA 100. A positioning device, in this example a nanopositioner 35 (shown in more detail in FIG. 7), is disposed between the puck 30 and the test nest 20, which allows very fine positional changes of the head 101 to be made relative to a test track on the disk 5. The puck 30 is also movable to position the test nest 20 under the load kicker 12 so that a HGA 100 to be tested can be transferred to the test nest 20 from the load kicker 12; and to move the tested HGA 100 under the unload kicker 13 so that the tested HGA 100 can be removed and transferred to the carriage 50.

Figure 6:
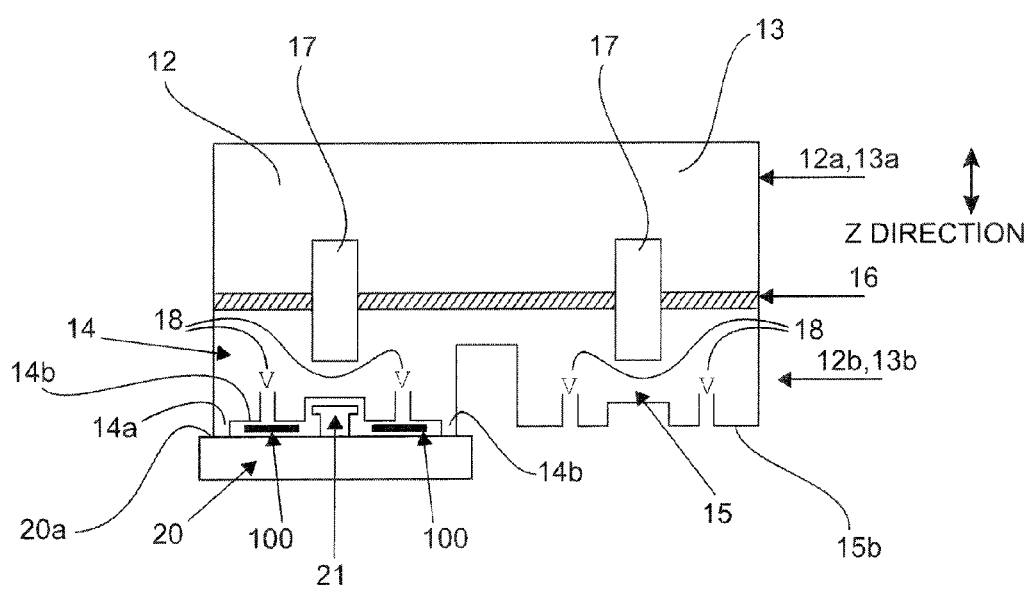
FIG. 6 shows a detail view in cross section of a HGA being received by the test nest from the pick.

FIG. 6 shows a cross section of the kickers 12, 13 with the load kicker 12 transferring a HGA 100 to the test nest 20. The lower surface 14b of the load end effector 14 is generally flat and has vacuum ports 18 formed in it. The base plate 105 of the HGA 100 is held against this surface 14b by the action of the vacuum. The load end effector 14 also has portions 14a extending downward from the surface 14b. (The unload end effector 15 optionally does not have such extending portions, as shown in FIG. 6 and as described in more detail below.) Thus, a depression is formed in the end of the load kicker 12 in which the base plate 105 of the HGA 100 is received when held by the end effector 14. This depression is slightly deeper than the thickness of the base plate 105 of the HGA 100. This means that, when delivering an HGA 100 to the test nest 20, the load kicker 12 is actuated downwards until the extending portions 14a make contact with top surface 20a of the test nest 20, at which point the HGA 100 is not yet in contact with the test nest 20. The vacuum holding the HGA 100 is then released so that the HGA 100 falls a very small distance onto the test nest 20.

In order to reduce the shock transmitted to the deck 2 via the test nest 20 when the kickers 12, 13 descend and make contact with the test nest 20, the upper parts 12a, 13a of the kickers 12, 13, i.e. the part that is actuated vertically, is isolated by a compliant layer of material 16 from the lower parts 12b, 13b of the kickers 12, 13, i.e. the parts having the end effectors 14, 15 which contact the test nest 20. One or more guide members 17, such as guide pins, are provided to ensure that the lower parts 12b, 13b cannot move laterally with respect to the upper parts 12a, 13a, while allowing some vertical movement between the parts.

Figure 7:
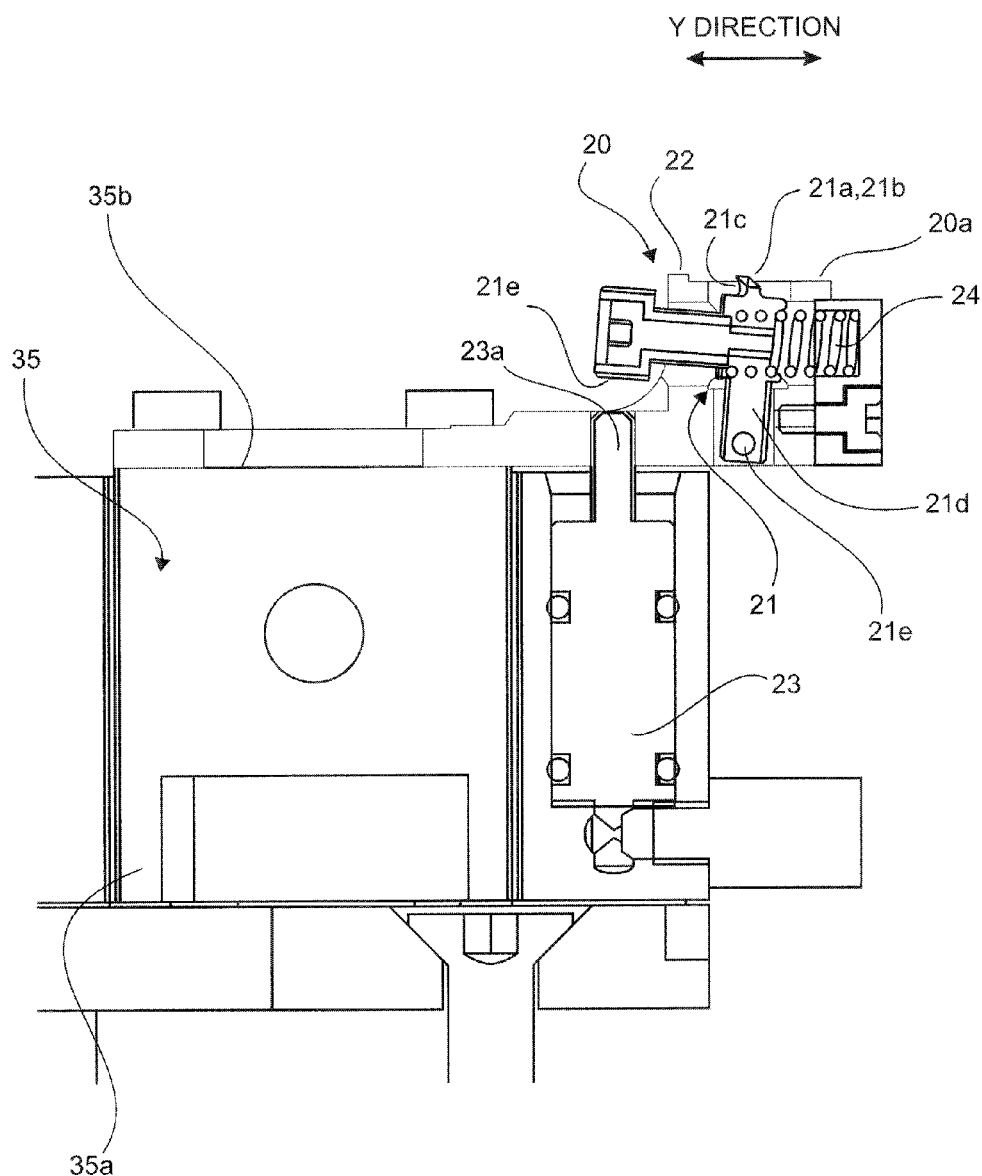
FIG. 7 shows a cross section view in the y-z plane of the test nest of FIG. 2.

As shown in FIG. 7, the test nest 20 comprises an engagement member, which in this example is provided by a mushroom-shaped pawl 21 (shown in cross section in FIG. 6) having a head portion 21a and a stem portion 21b which protrude from the top surface 20a of the test nest 20. The stem portion 21a has a smaller diameter than the head portion 21a. As can be seen from FIG. 7, the leading surface 21c of the pawl 21 is slanted downwards. The pawl 21 also comprises an pivot member 21d, the lower end of which is pivoted to the test nest 20 by a pivot 21e and the upper end of which supports the stem 21b and head 21a. Thus, due to the pivoted mounting of the pawl 21, the head and stem portions 21a, 21b move in a shallow arc as the pawl 21 pivots. As will be appreciated, when the head 21a is above the pivot 21e, the movement of the head 21a is effectively horizontal. As the head 21a moves past the pivot 21e, the movement of the head 21a has an increasing downward component as well as a horizontal component.

The test nest 20 also has two stops 22 extending from its top surface 20a. The pawl 21 is moved by an actuator 23 and a spring 24. The spring 24 is fixed between the test nest 20 and the pawl 21 and biases the pawl 21 in the y-direction towards the stops 22. The actuator 23, in this example a pneumatic cylinder, is mounted to the puck 30. Actuation of the actuator 23 causes a protruding part 23a of the actuator 23 to push against a protruding part 21e of the pivot member 21e causing the pawl 21 to pivot against the bias of the spring 24 and thus to move the pawl 21 in the y-direction away from the backstops 22.

Referring now to FIGS. 8A and 8B, to receive a HGA 100 in the test nest 20, the pawl 21 is first actuated by the actuator 23 to move against the bias of the spring 24 to a preload position. A HGA 100 is then placed in position on the test nest 20 by the load kicker 12 as previously described. So positioned, the head portion 21a and some of the stem portion 21b of the pawl 21 pass through the boss hole 106 of the HGA 100.

Next, the actuator 23 is deactivated, allowing the spring 24 to move the pawl 21 towards the stops 22. Due to the horizontal component of the motion of the pawl 21, the stem 21b contacts the edge of the boss hole 106 of the HGA 100 and pushes the HGA 100 in the y-direction until its two locating tabs 107 both press against the stops 22. Once registered against the stops 22, the HGA 100 is precisely located in the y-direction and in its angular orientation. Because the diameter of the stem of the pawl 21 is less than the diameter of the boss hole 106, the movement of the pawl 21 in the y-direction also causes the HGA 100 to move in the x-direction to ensure precise alignment in that direction, which is achieved when the centre of the boss hole 106, the centre of the pawl 21 and the point of contact between the pawl 21 and the boss hole 106 are in a straight line parallel to the direction in which the pawl 21 moves, i.e. the y-direction. The stem portion 21a and the boss hole 106 preferably have a circular cross section to aid this alignment process.

As the stem 21b of the pawl 21 pushes the HGA 100 against the stops 22, the downward slant of the leading surface 21c pushes the HGA 100 downwards against the top surface 20a of the test nest 20 as the HGA 100 is registered against the stops 22. Also, as previously described, as the pawl 21 moves towards the stops 22, the motion of the head 21a of the pawl 21 develops a component in the z-direction due to the pivoted mounting of the pawl 21, which may additionally or alternatively contribute to clamping the HGA 100 against the top surface 20a of the test nest 20.

Thus, by this process the HGA 100 is precised and clamped to the test nest 20. The depression under the load end effector 14, keeps the HGA 100 loosely in position during this process, locating the HGA 100 with enough precision for the pawl 21 to accurately engage the boss hole 106 and for the HGA 100 to accurately engage with the stops 22, whilst allowing sufficient movement to allow precising of the HGA 100 by the pawl 21. FIGS. 8A and 8B show the HGA 100 before and after the precising operation.

As can be seen from FIG. 7, the nanopositioner 35 has a fixed part 35a attached to the puck 30 and a moving part 35b to which the test nest 20 is attached. As previously described, the actuator 23 is attached to the puck 30 and not to the test nest or moving part 35a of the nanopositioner 35. After the HGA 100 has been clamped by the spring 24, the actuator 23 is retracted away from the pawl 21 and test nest 20 so that there is no contact between actuator 23 and any part of the test nest 20 or the moving part 35a of the nanopositioner 35. Thus, when retracted, the actuator 23 is not supported by the moving part 35a of the nanopositioner 35 and does not interfere with the movement of the test nest 20 by the nanopositioner 35. This is advantageous as it reduces the mass that must be moved by the nanopositioner 35 by not having the actuator 23 supported by the moving part 35a. This allows more responsive moving of the head 101 by the nanopositioner 35 during testing.

Figure 9:
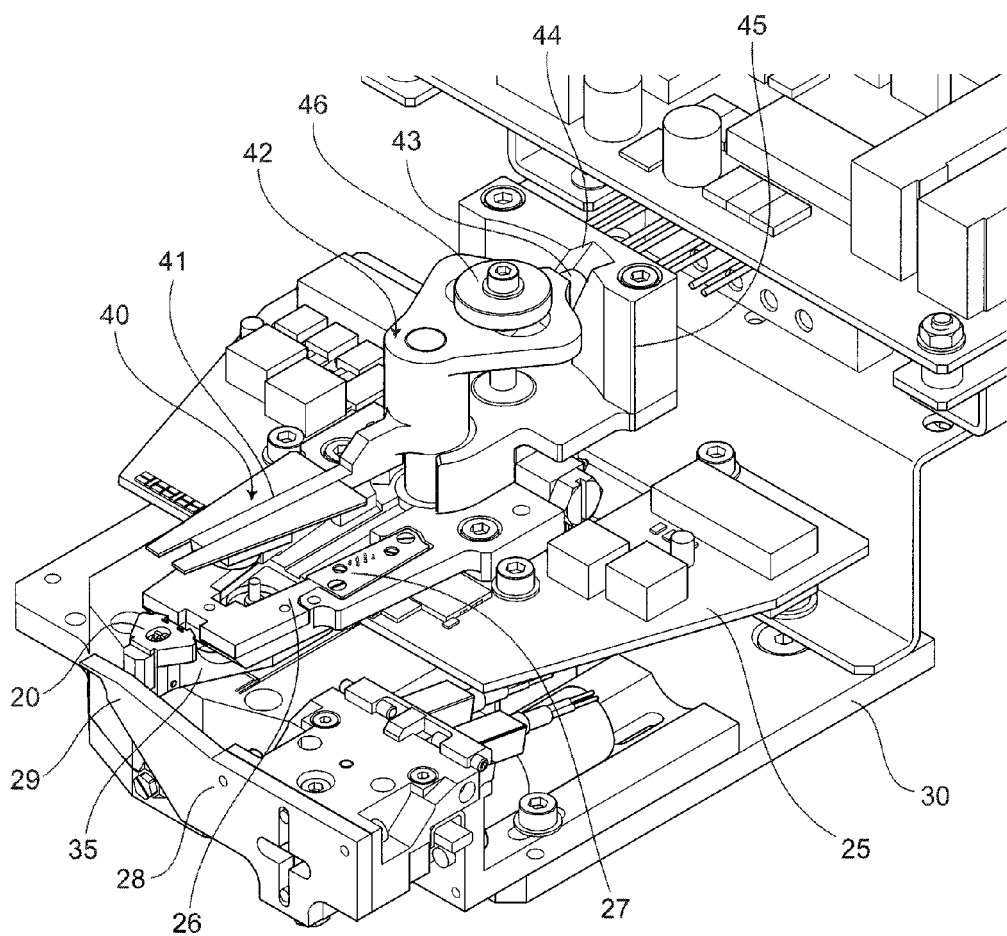
FIGS. 9 and 10 show the test nest prepared to receive HGAs in the down head configuration and up head configuration respectively; and, FIGS. 11 and 12 show the test nests of FIGS. 9 and 10 respectively with the FOS clamp in the clamping position.

Next, electrical connection must be made between the spinstand 1 and the HGA 100. Referring to FIG. 9, the puck 30 has a preamp board 25 for pre-amplifying the data signals from the head 101. This needs to be connected to the HGA 100. Behind the test nest 20 is a surface portion of the puck called the FOS support 26, which is for supporting the FOS 108 when a HGA 100 is held by the test nest 20. Near the test nest 20 is a pogo pin block 27, which comprises an array of sprung connector pins. These are positioned so that when a HGA 100 is held by the test nest 20, the connector pins of the pogo block 27 are underneath the electrical contacts 109 of the HGA 100.

A FOS clamp 40 is mounted to the puck 30 and can be actuated to urge together the sprung connector pins of the pogo block 27 and the electrical contacts 109 of the HGA so that electrical connection is made from the preamp board 25 to the HGA 100 and for flattening the FOS 108 against the FOS support 26.

The FOS clamp 40 comprises a clamping member 41, which is pivotably mounted to the puck 30 via a pivot 42 that allows up and down movement of the clamping member 41 in the z-direction as well as pivotable movement in the x-y plane. One end of the clamping member 41 is shaped for flattening the FOS 108 and making the electrical contact between the contacts 109 and the pogo block 27. The other end of the clamping member 41 has a cam 43 which is engaged with a groove 44 provided in a structure 45 removably attached to the puck 30. An actuator 46, for example a pneumatic control, is arranged to move the clamping member 41 up and down. When moving up, the clamping member 41 is made to rotate to one side or the other by the cam 43 moving in the groove 44, due to the angle of the groove 44. This is to make room for an HGA 100 to be placed on the test nest 20 with the FOS 108 resting on the FOS support 26. The clamping member 41 is then actuated downwards, while being forced to rotate to its central, clamping position by the cam 43 moving in the groove 44, thus flattening the FOS 108 to the FOS support portion 26 and making the electrical connection between the pogo pin block 27 and the electrical contacts 109 on the HGA 100 when a HGA 100 is on the test nest 20.

Figure 11:
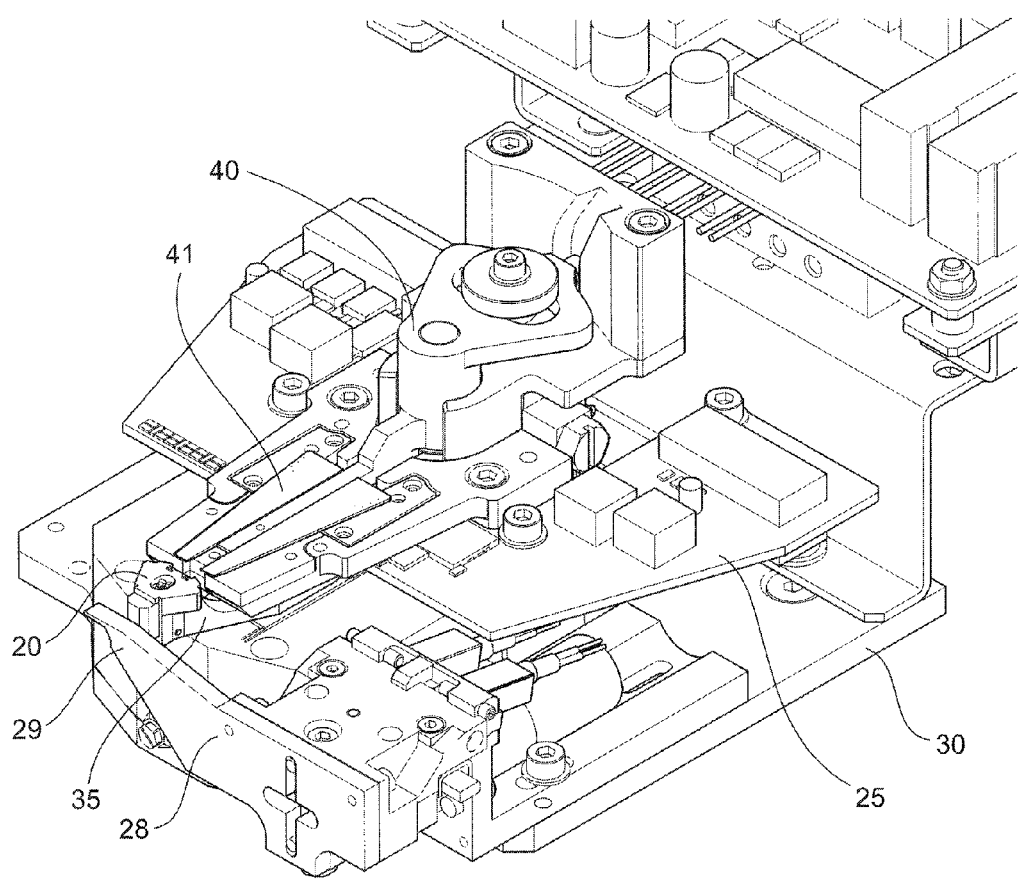

Flattening the FOS 108 prevents it from vibrating due to windage from the disk 5 during testing. FIG. 11 shows the FOS clamp 40 in the clamping position. For clarity, FIG. 11 does not show a HGA 100 in situ.

During the transfer of a HGA 100 from the load kicker 12 to the test nest 20, a pre-loader plunger (not shown) attached to the load kicker 12 is actuated so as to press down on the suspension arm 103 of the HGA 100, bending it so that the head 101 is moved vertically downwards into its preload position. A head loader 28 having a retractable ramp 29 is attached to the puck 30. With the suspension arm 103 and head 101 in the preload position, the ramp 29 is actuated to move in from the side of the HGA 100 and to engage with the top of the suspension arm 103 so as to maintain the head 101 in the preload position. The pre-loader plunger is then raised and the load kicker 12 disengaged, actuated upwards and can be moved away.

The puck 30 is then moved so that the head 100 is over the desired track on the disk 5, and the head 100 is loaded onto the surface of the disk 5 by retracting the head loader 28 allowing the head 101 to rise to its operating position. Once the head 101 is above the desired part of the disk surface, the ramp 29 disengages, allowing the head 101 to fly on the surface of the disk 5. The profile of position against time of how the head 101 is loaded to the disk 5 is determined by the profile of a cam (not shown) which rotates to move the head loader 28. Different position/time profiles, as may be required for different types of HGA 100, can readily be obtained by using cams with different profiles. Alternatively, a rack and pinion mechanism or indeed any other suitable mechanism can be used to load the head 101 to the disk 5.

With the head 101 loaded to the disk 5, testing can take place, i.e. data can then be written to or read from the test track of data on the disk 5, whilst the nanopositioner 35 is used to make fine positional changes to the head 101 relative to the test track.

Now, in hard disk drives both surfaces of each disk are typically used. As a result HGAs 100 are produced in two types, known as up HGAs and down HGAs, which are mirror images of each other and used respectively for the two surfaces of a disk 5.

Figure 10:
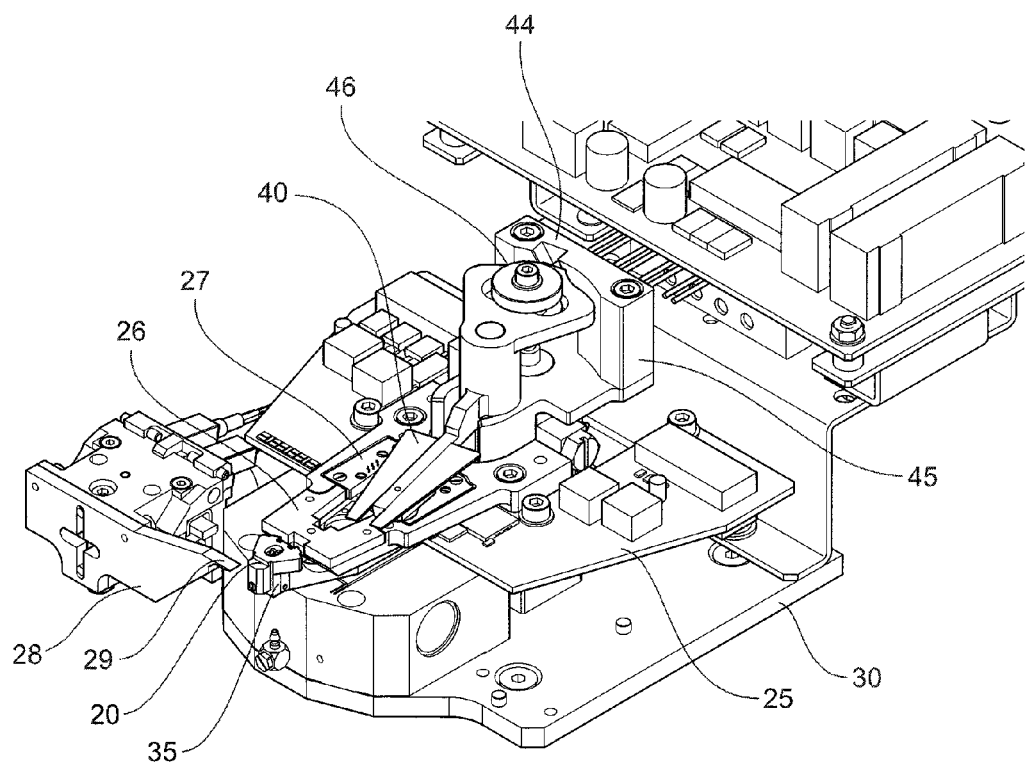
Figure 12:
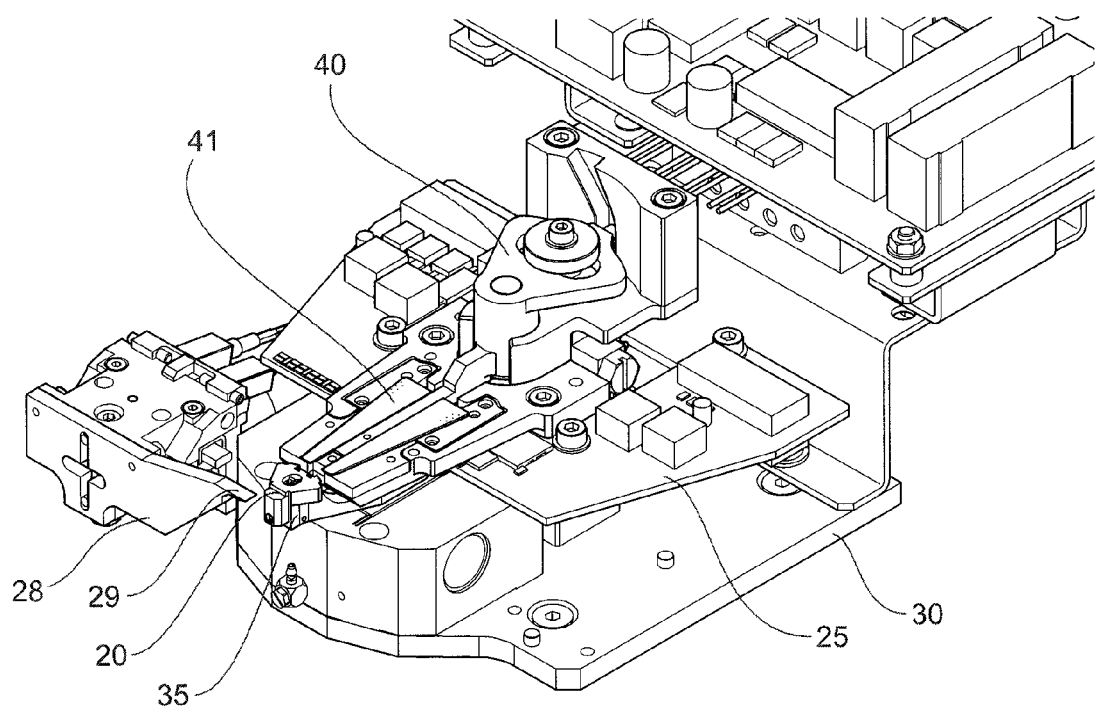

It is desirable for the spinstand 1 to be able to test both types of HGA 100. This is accomplished in the present example of a spinstand 1 as follows. Testing is performed on one surface of the disk 5 only and to test the two types of HGA 100, the disk 5 is spun in a different direction for each. Two pogo pin blocks 27 are provided, respectively in the correct position for the two types of HGA 100. The clamping member 41 of the FOS clamp 40 extends on each side of the centreline of the test nest in the y-direction, corresponding to the position of the FOS 108 for each type of HGA 100. The movement of the clamping member 41 to the side can be altered to be suitable for the type of HGA 100 by changing the orientation of the groove 44 in which the cam 43 moves, for example by unfastening the structure 45 in which the groove 44 is formed and substituting another structure 45. The head loader 28 and ramp 29 are designed so that they can be readily moved onto either side of the test nest, again, for example, by unfastening and refastening on the other side. FIGS. 9 and 10 show the FOS clamp in the disengaged position for the down and up head configurations. FIGS. 11 and 12 show the FOS clamp in the engaged position for the down and up head configurations.

So, during the testing cycle, having removed a tested HGA 100 from the unload nest 53 and placed a new HGA 100 to be tested on the load nest 52, the operator signals the spinstand 1, for example by pressing a button, that testing can begin. The carriage 50 then moves inside the enclosure 3, and the HGA 100 is picked up from the load nest 52 by the load kicker 12. The pick 10 is then moved by the linear actuator 11 to a different position on the deck 2 for exchanging the HGA 100 with the test nest 20. The puck 30 is moved so that the test nest 20 is under the load kicker 12 and the HGA 100 is transferred to the test nest 20. The various operations described above are then performed to mount the HGA 100 to the test nest 20 and the HGA 100 is tested.

When testing is complete the puck 30 is moved so that the tested HGA 100 can be picked up from the test nest 20 by the unload kicker 13. To remove an HGA 100 from the test nest 20, the kicker 13 descends until the unload end effector 15 is in contact with the HGA 100. The pawl 21 is then moved by the actuator 23 to release the HGA 100 and vacuum is applied to the vacuum ports 18 of the unload end effector 15 to hold the HGA 100. As can be seen from FIG. 6, in the present example, in contrast to the load end effector 14, the unload end effector 15 does not have a depression in its end, i.e. its lower surface 15a is generally flat, so as to help the vacuum to pick up and hold the HGA 100, and ensures that there is no lateral movement as the HGA 100 is transferred from the test nest 20 to the unload kicker 13. Nonetheless, in other examples of the spinstand, the unload end effector 15 may have similar protrusions as the load end effector 14. The unload kicker 13 picks up the HGA 100 and transfers it to the unload nest 53 on the carriage 50. Finally the carriage 50 moves outside the safety enclosure 3 so that the tested HGA 100 may be removed and an untested one placed on the load nest 52, and the cycle repeats.

All the movements of the spinstand 1 are controlled automatically, for example by computer control.

Embodiments of the present invention have been described with particular reference to the example illustrated. However, it will be appreciated that variations and modifications may be made to the examples described within the scope of the present invention. For example, the invention is not limited to the specific spindle types or arrangements, or puck 30 positioning devices, or actuators specifically described in the description. In an alternative embodiment the HGAs may be handled by an automation system external to the spinstand which replaces the carriage 50.

The invention claimed is:

1. A spinstand for testing a head gimbal assembly, the spinstand comprising:
    a gripper operable to grip a head gimbal assembly; and,
    a load pick device operable to hold the head gimbal assembly and to move the head gimbal assembly into an exchange position where it can be gripped by the gripper,
    wherein in said exchange position a portion of the load pick device registers with the gripper and another portion of the load pick device is spaced from the gripper so as to form a space therebetween, in which space at least a portion of a said head gimbal assembly is located in use.

2. A spinstand according to claim 1, wherein the load pick device has a surface against which the head gimbal assembly is held when held by the load pick device and at least one protrusion extending from said surface for registering with the gripper.

3. A spinstand according to claim 2, wherein said surface against which the head gimbal assembly is held is in communication with at least one fluid port via which low fluid pressure can be applied to hold said head gimbal assembly.

4. A spinstand according to claim 1, comprising an unload pick device for picking up a said head gimbal assembly from the gripper, wherein the unload pick is arranged not to register with the gripper when picking up a said head gimbal assembly.

5. A spinstand according to claim 1, wherein a first end of one or both pick devices is compliantly attached to the second end of that pick device and, and wherein at least one guide member is attached between the first and second ends of that pick device so that relative movement between the first and second ends of that pick device is substantially limited to only one direction.

6. A spinstand according to claim 1, wherein the gripper comprises an engagement member which is movable to fix in place the head gimbal assembly.

7. A spinstand according to claim 6, comprising:
    a positioning device having a base portion and a movable portion which is movable relative to the base portion, the gripper being supported by the movable portion so that the gripper is positionable by the positioning device; and,
    an actuator operable to engage with and move the engagement member, the actuator being supported by the base portion of the positioning device and not by the movable portion of the positioning device.

8. A spinstand according to claim 6, wherein the engagement member is biased to be in a position where it fixes in place the head gimbal assembly, wherein the actuator is operable to move the engagement member against the bias.

9. A spinstand according to claim 6, wherein the gripper comprises a base portion to which the engagement member is movably attached, at least one stop extending from the base portion; wherein the engagement member is arranged and configured to move such that the engagement member urges the head gimbal assembly against the stop and clamps the head gimbal to the base portion of the gripper.

10. A spinstand according to claim 9, wherein the engagement member comprises a stem portion and a head portion, the head portion having a greater diameter than the stem portion so as to provide a shoulder therebetween, wherein the engagement member is arranged and configured to move such the stem portion acts against the side of the boss hole of the head gimbal assembly to urge the head gimbal assembly against the stop and the shoulder clamps the head gimbal assembly against the base portion of the gripper.

11. A spinstand according to claim 10, wherein the or each stop presents a planar surface against which the head gimbal assembly is urged.

12. A spinstand according to claim 6, wherein the engagement member is pivotably mounted.

13. A spinstand for testing a head gimbal assembly, the spinstand comprising:
    a gripper operable to grip a said head gimbal assembly, wherein the gripper comprises a movable engagement member which, when a head gimbal assembly is offered up to the gripper, is movable to fix in place the head gimbal assembly;
    a positioning device having a base portion and a movable portion that is movable relative to the base portion, the gripper being supported by the movable portion so that the gripper is positionable by the positioning device; and
    an actuator operable to engage with and move the engagement member, the actuator being supported by the base portion of the positioning device and not by the movable portion of the positioning device.

* * * * *